Figure 1:
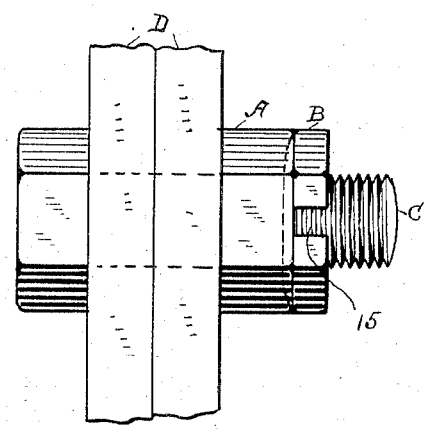

No. 783,572. PATENTED FEB. 28, 1905.
C. W. GIBBS.
NUT LOCK.
APPLICATION FILED NOV. 29, 1904.

WITNESSES:
H. A. Lamb
S. W. Atherton

INVENTOR
Charles W. Gibbs
BY
N. M. Wooster
ATTORNEY

No. 783,572. Patented February 28, 1905.

UNITED STATES PATENT OFFICE.

CHARLES W. GIBBS, OF BRIDGEPORT, CONNECTICUT, ASSIGNOR TO COLUMBIA NUT AND BOLT COMPANY, OF BRIDGEPORT, CONNECTICUT, A CORPORATION OF NEW YORK.

NUT-LOCK.

SPECIFICATION forming part of Letters Patent No. 783,572, dated February 28, 1905.

Application filed November 29, 1904. Serial No. 234,730.

*To all whom it may concern:*

Be it known that I, CHARLES W. GIBBS, a citizen of the United States, residing at Bridgeport, county of Fairfield, State of Connecticut, have invented a new and useful Lock-Nut, of which the following is a specification.

My invention relates to the class of lock-nuts in which a threaded sleeve forming an integral part of one member is compressed upon a bolt by the other member to lock the nut in place, and has for its object to improve the construction of this class of nuts by providing, in addition to the usual incline upon the sleeve, quick-acting inclines upon the contiguous faces of the members which act to give a quick final compression to the sleeve by which the nut is more securely locked in place.

With this and other objects in view I have devised the simple and novel two-part lock-nut, of which the following description, in connection with the accompanying drawings, is a specification, reference characters being used to indicate the several parts.

Figure 2:
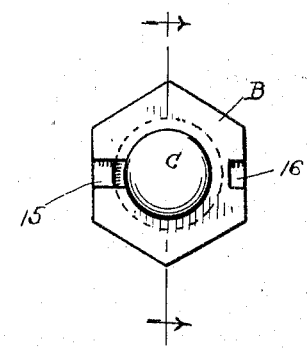
Figure 3:
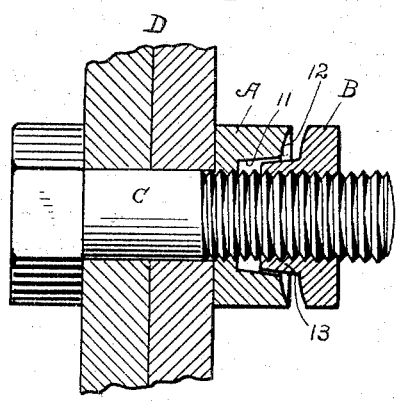
Figure 4:
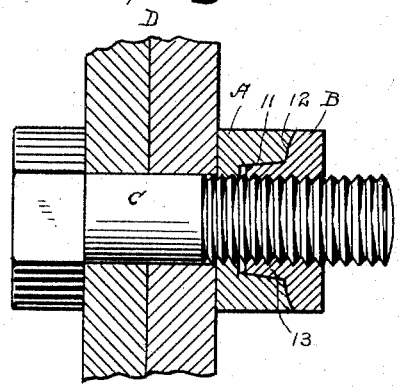
Figure 5:
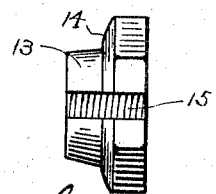
Figure 6:
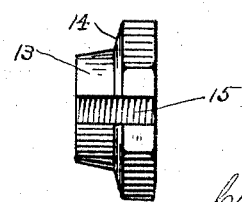

Figure 1 is an elevation illustrating the use of my novel lock-nut, the parts being in the locking position; Fig. 2, an end elevation corresponding therewith, the work being omitted; Fig. 3, a sectional view, the bolt being in elevation, showing the female member set up to place and the male member about to be placed in engagement therewith; Fig. 4, a similar view showing the male member set up to the locking position, and Figs. 5 and 6 are elevations of slightly-variant forms of the male member detached.

A denotes the female member as a whole; B, the male member; C, a bolt, and D work that is being held by the bolt and nut. The female member is provided with a threaded portion 10 to engage a bolt with an outwardly-tapering recess 11 and in its outer face with an abrupt or quick-acting inwardly-extending incline 12, which runs into recess 11 and may be either a straight line, as seen in section, or a slightly-concave curve, as preferred. The male member is threaded its entire length to engage a bolt and is provided with a sleeve 13, which is tapered externally to correspond with the taper of recess 11 in the female member and with an abrupt or quick-acting incline 14, which may be either a straight incline, as in Fig. 6, or a slightly-concave curve, as in Fig. 5, the taper of this incline corresponding, of course, with the taper of incline 12 upon the female member, so as to give the greatest possible amount of engaging surface. 15 denotes a slot which extends the entire length of the male member. The male member is also provided with an external groove 16 diametrically opposite the slot 15 to give contractile resiliency to said member, so that it will grip the bolt tightly even should it be slightly under size when it is tightened up.

The operation is as follows: The female member is applied first and is set up against the work. The male member is then turned up against it until the tapering sleeve has firm bearing upon the tapering recess in the female member. A wrench is then applied to both members, and they are set up together against the work. After the nut as a whole has been set up against the work the wrench is applied to the male member only, and that is set up as tightly as possible, the effect of which is, through the engagement of abrupt incline 14 on the male member with the corresponding inwardly-extending incline 12 on the female member, to compress the slot in the male member and cause the male member to grip the thread of the bolt tightly, so that the nut cannot become loose under the ordinary or even extraordinary conditions of use. It should be noted that the sleeve upon the male member is slightly shorter than the depth of the recess in the female member, so that the end of the sleeve will not quite touch the bottom of the recess, and inclines 12 and 14 are free to act with their full effect to compress the male member on the bolt. To loosen the nut, the wrench is first applied to the male member, which is given a turn more or less backward to loosen it, the resiliency of the metal causing it to expand the instant the pressure of the inclines upon the male member against the corresponding inclines on the female member is relieved. The wrench is then applied to both members and the nut turned backward precisely like an ordinary nut.

Having thus described my invention, I claim—

A lock-nut comprising a female member having a threaded portion to engage a bolt, a tapering recess, and in its outer face an inwardly-extending quick-acting incline which runs into the recess, and a threaded male member having a tapered sleeve shorter than the depth of the recess in the female member and shaped to correspond with the taper of said recess, said male member having also an abrupt quick-acting incline corresponding with the incline in the outer face of the female member, a slot extending its entire length, and an external groove diametrically opposite the slot, substantially as described, for the purpose specified.

In testimony whereof I affix my signature in presence of two witnesses.

CHARLES W. GIBBS.

Witnesses:
　FRED ATWATER,
　A. M. WOOSTER.